US011046055B1

(12) United States Patent
Yang et al.

(10) Patent No.: US 11,046,055 B1
(45) Date of Patent: Jun. 29, 2021

(54) AIR-FLOATING THIN FILM BONDING APPARATUS AND ITS AIR-SUPPLYING ROLLER

(71) Applicants: PROLOGIUM TECHNOLOGY CO., LTD., Taoyuan (TW); Prologium Holding Inc., Grand Cayman (KY)

(72) Inventors: Szu-Nan Yang, Taoyuan (TW); Ching-Ho Wang, Taoyuan (TW)

(73) Assignees: PROLOGIUM TECHNOLOGY CO., LTD., Taoyuan (TW); Prologium Holding Inc., Grand Cayman (KY)

( * ) Notice: Subject to any disclaimer, the term of this patent is extended or adjusted under 35 U.S.C. 154(b) by 0 days.

(21) Appl. No.: 16/952,791

(22) Filed: Nov. 19, 2020

(30) Foreign Application Priority Data

Dec. 30, 2019 (TW) ................................. 108148289

(51) Int. Cl.
| | |
|---|---|
| *B32B 15/08* | (2006.01) |
| *B32B 27/16* | (2006.01) |
| *B32B 37/22* | (2006.01) |
| *B65H 18/26* | (2006.01) |

(52) U.S. Cl.
CPC .............. *B32B 15/08* (2013.01); *B32B 27/16* (2013.01); *B32B 37/226* (2013.01); *B65H 18/26* (2013.01)

(58) Field of Classification Search
CPC ....... B32B 15/08; B32B 37/226; B32B 27/16; B65H 18/26

USPC ........................................................ 156/62.2
See application file for complete search history.

(56) References Cited

U.S. PATENT DOCUMENTS

| | | | |
|---|---|---|---|
| 9,430,865 B2 * | 8/2016 | Kim ..................... | H04N 9/3194 |
| 2013/0330472 A1 * | 12/2013 | Honda ................... | B65G 13/00 |
| | | | 427/248.1 |

FOREIGN PATENT DOCUMENTS

| | | |
|---|---|---|
| CN | 202625438 U | 12/2012 |
| TW | M282318 U | 12/2005 |
| TW | 201202022 A | 1/2012 |
| TW | M580041 U | 7/2019 |
| WO | 2012/039218 A1 | 3/2012 |

* cited by examiner

*Primary Examiner* — Francisco W Tschen
*Assistant Examiner* — Abhishek A Patwardhan
(74) *Attorney, Agent, or Firm* — Rabin & Berdo, P.C.

(57) ABSTRACT

An air-floating thin film bonding apparatus and its air-floating roller is provided. The apparatus is composed of an air-floating rollers, which can blow out airflow at a specific angle to be applied to the base film with three-dimensional obstacles. The positive pressure provided by the airflow can be utilized to fill the gap space caused by the three-dimensional obstacles. Therefore, the base film can bond to the bonding film tightly to overcome the wrinkles and defects caused by the three-dimensional obstacle and the problem of unflatness of the film-bonding can be solved.

10 Claims, 6 Drawing Sheets

AIR-FLOATING THIN FILM BONDING APPARATUS AND ITS AIR-SUPPLYING ROLLER

BACKGROUND OF THE INVENTION

Cross References to Related Applications

The present application claims priority to Taiwanese Patent Application 108148289 filed in the Taiwanese Patent Office on Dec. 30, 2019, the entire contents of which is being incorporated herein by reference.

FIELD OF INVENTION

The present invention relates to a thin film bonding apparatus, in particular to an air-floating thin film bonding apparatus and its air-floating roller to fill the gap space by the airflow of the air-floating roller to overcome the wrinkles and defects caused by the gap space and the problem of unflatness of the film-bonding can be solved.

RELATED ART

In recent years, various electronic products have developed towards to lightness, thinness and microminiaturization, which has made the application of the film bonding technologies more extensive. The most common film bonding technology is the roll to roll method, which is a high-efficiency, continuous production method, and is a specialized treatment for the flexible thin films. In this method, the cylindrical base material and the cylindrical thin film material to be bonded are pressed by rollers to achieve continuous bonding. After the bonding is completed, it can be rolled into a cylindrical shape or to be cut as a semi-finished product for subsequent processing.

The main key of the thin film bonding is how to bond the thin film without wrinkles to make the lamination be flat. The WO2011093427A1 mainly uses an insulating film, a metal foil, a divider film, a metal foil and an insulating film to be bonded via thermocompression bonding. Two laminates, each with one metal-plated side, can then be separated from the divider film to achieve the flattened bonding.

However, in case of an existing coating layer on the back of the film to be bonded, the coating layer will form a three-dimensional obstacle. And there will be a gap space between the three-dimensional obstacles. In addition, the thickness of the film is relatively thin, which cannot provide sufficient stiffness. Therefore, wrinkles and defects will occur and make the film be unflat. Many techniques are provided to improve the flatness for the thin films bonding. However, the conditions with three-dimensional obstacles are not considered in these techniques.

Therefore, this invention provides an air-floating thin film bonding apparatus and its air-floating roller to overcome the conventional shortages caused by the three-dimensional obstacles.

SUMMARY OF THE INVENTION

It is an objective of this invention to provide an air-floating thin film bonding apparatus and its air-floating roller to overcome the forgoing shortcomings. The positive pressure provided by the airflow of the air-floating roller can be utilized to fill the gap space caused by the three-dimensional obstacles to achieve the flattened bonding.

In order to implement the abovementioned, this invention discloses an air-floating thin film bonding apparatus and its air-floating roller, which includes at least two feed rollers, a bonding roller and an air-floating roller. The feed rollers are used to guide a base film and a bonding film to be bonded together, and the base film includes a first surface and an opposite second surface. At least two thin-film components with a gap space therebetween are disposed on the second surface. The bonding roller receives the bonding film guided by one of the feed roller. The air-floating roller receives the base film guided by the another feed roller, and the air-floating roller is disposed adjacent and corresponding to the bonding roller to press the bonding film to bond to the first surface of the base film. The air-floating roller can continuously supply an airflow with a positive pressure during bonding to the second surface of the base film to fill the gap space caused by the three-dimensional obstacles.

Therefore, the stiffness of the base film is increased to make the base film bond to the bonding film tightly.

Further, the air-floating roller includes an outer roller, an inner cylinder and an air source. The outer roller includes a plurality of blowing holes on its outer surface and is rotatable. The inner cylinder is fixed without rotation and is disposed in the outer roller. Also, the inner cylinder includes a plurality of through holes within a predetermined angle on its outer surface. The inner cylinder can receive the airflow of the air source and guide the airflow to the blowing holes of the outer roller via the through holes of the inner cylinder to fill the gap space of the base film during bonding. The predetermined angle is 20-90 degrees. Therefore, the wrinkles and defects caused by the gap space are overcome and the problem of unflatness of the film-bonding can be solved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1A:
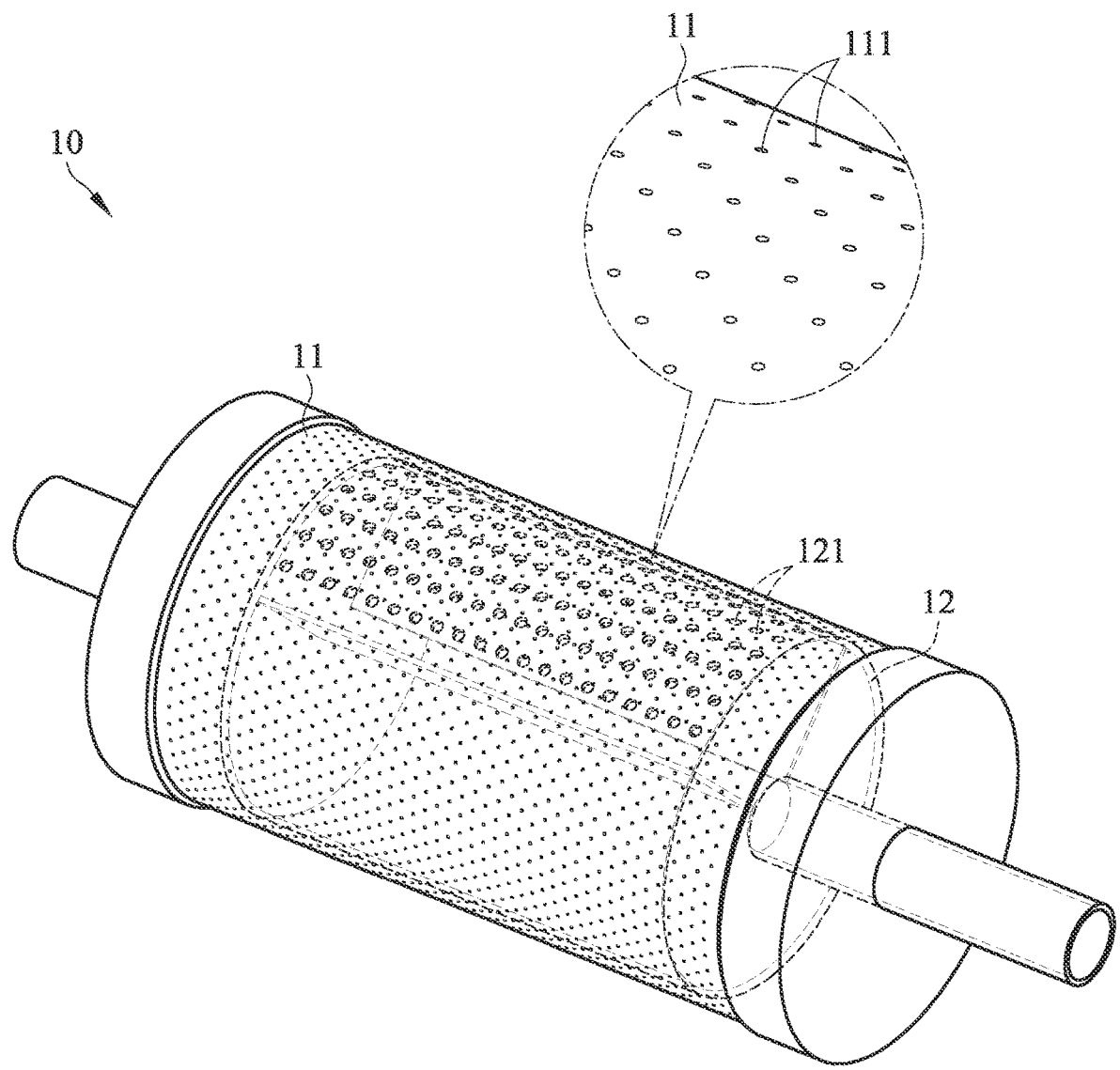
FIG. 1A is a schematic diagram of the air-floating roller of this invention.
Figure 1B:
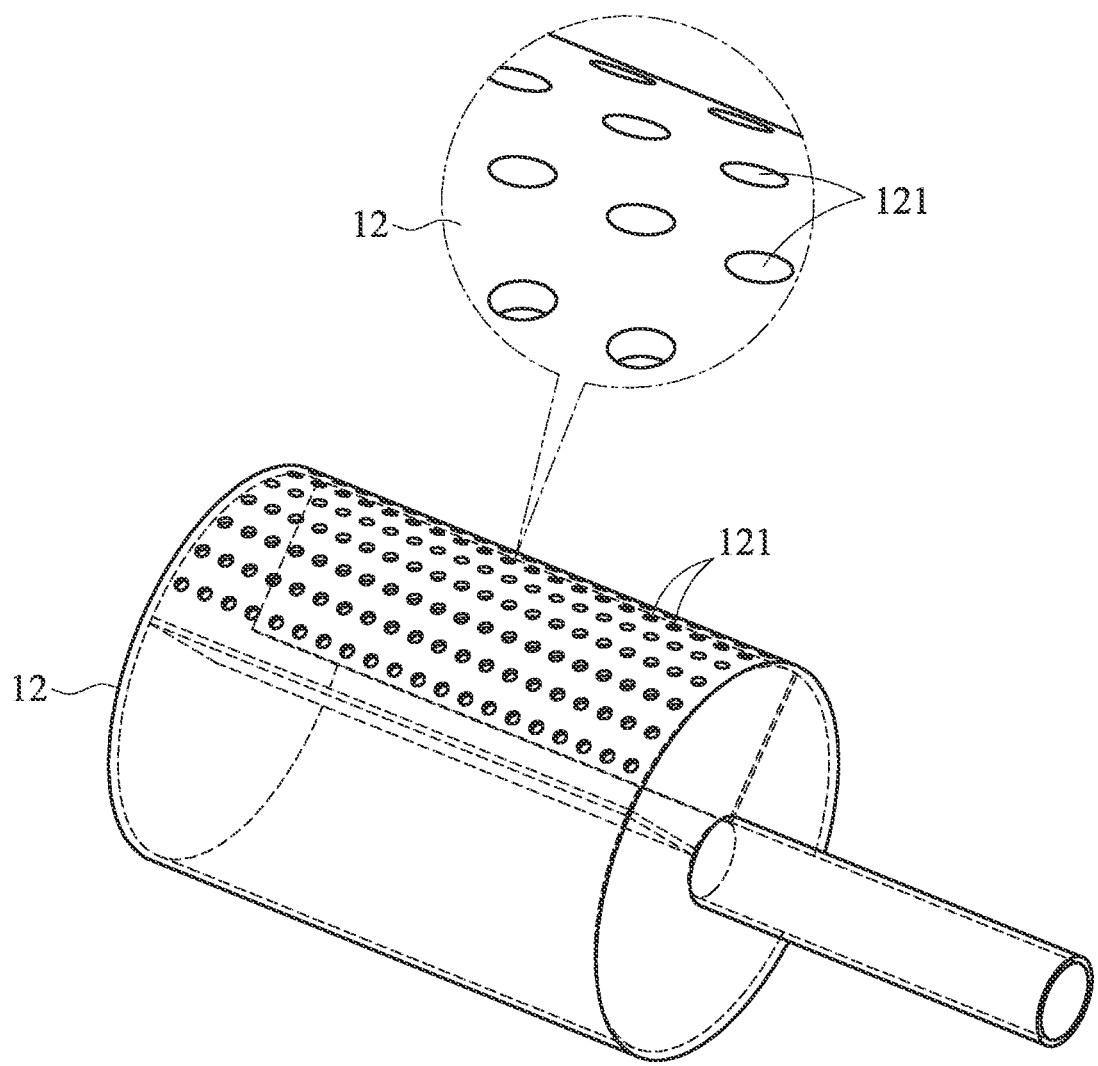
FIG. 1B is an exploded diagram of the air-floating roller of this invention.

The invention discloses an air-floating roller, which can continuously supply an airflow with a positive pressure to fill the gap space of the films to be bonded to overcome the wrinkles and defects caused by the three-dimensional obstacle and make the films be bonded tightly. Please refer to FIGS. 1A and 1B, the air-floating roller 10 includes an outer roller 11 and an inner cylinder 12. The outer roller 11 is rotatable and guides the bonding film to be pressed. Therefore, the outer roller 11 is substantially a hollow cylinder, and includes a plurality of blowing holes 111 on its outer surface. Because the outer roller 11 is in direct contact with the film to be bonded, the size of the blowing holes 111 should not be too large (to be described in detail later). The inner cylinder 12 is fixed without rotation and is disposed in the outer roller 11. Also, the inner cylinder includes 12 a plurality of through holes 121 within a predetermined angle on its outer surface. Because the inner cylinder 12 does not need to be rotated in company with the film to be bonded or during the bonding process, it only needs to be able to guide an air to pass through the through holes 121. Therefore, the inner cylinder 12 can be partially solid or hollow. It is sufficient to guide the airflow to the through holes 121. Compared with the aforementioned blowing holes 111 of the outer roller 11, the size of the through holes 121 can be larger to provide sufficient airflow.

Figure 2A:
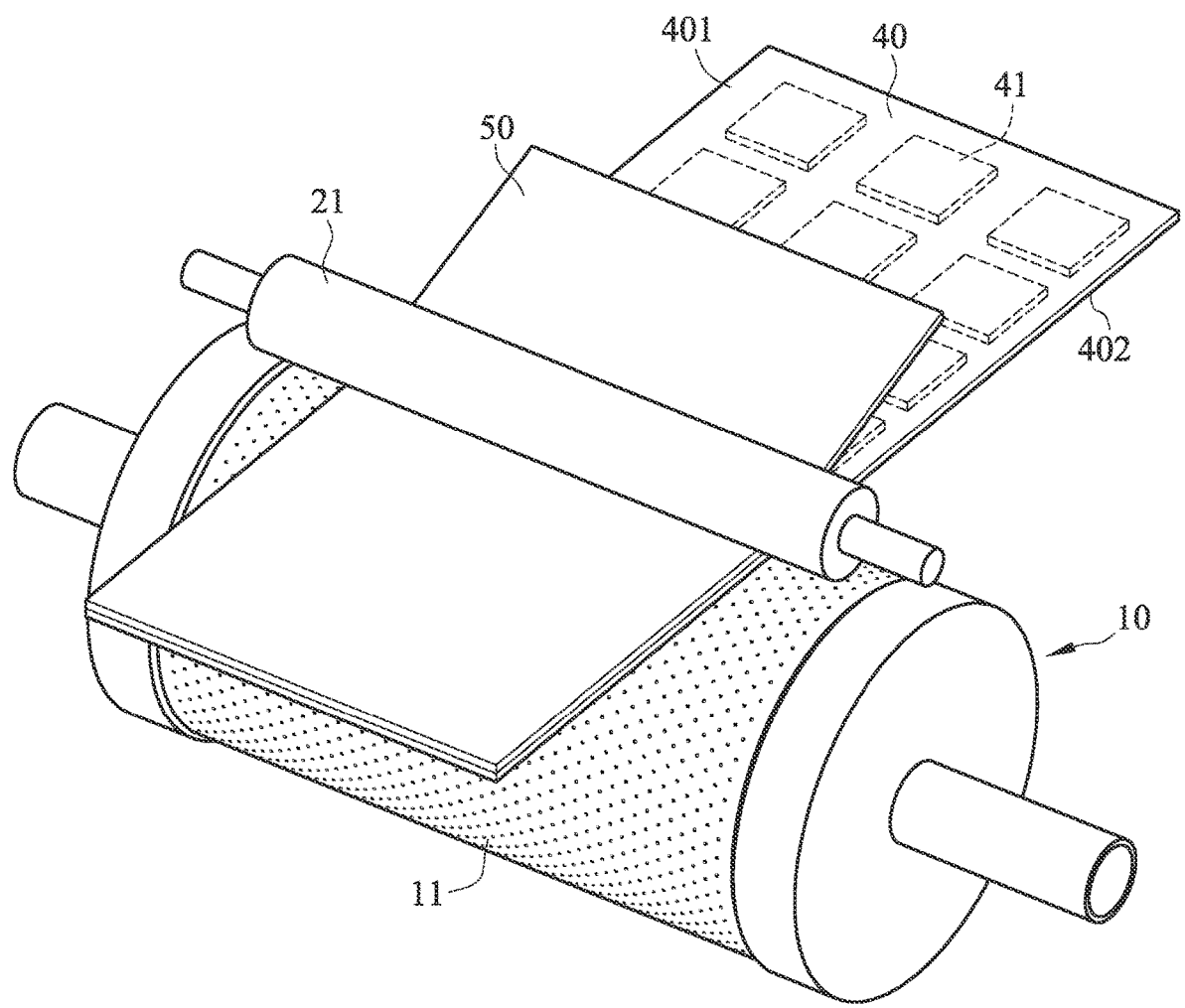
FIGS. 2A and 2B are schematic diagrams of the air-floating roller when in use of this invention.
Figure 2B:
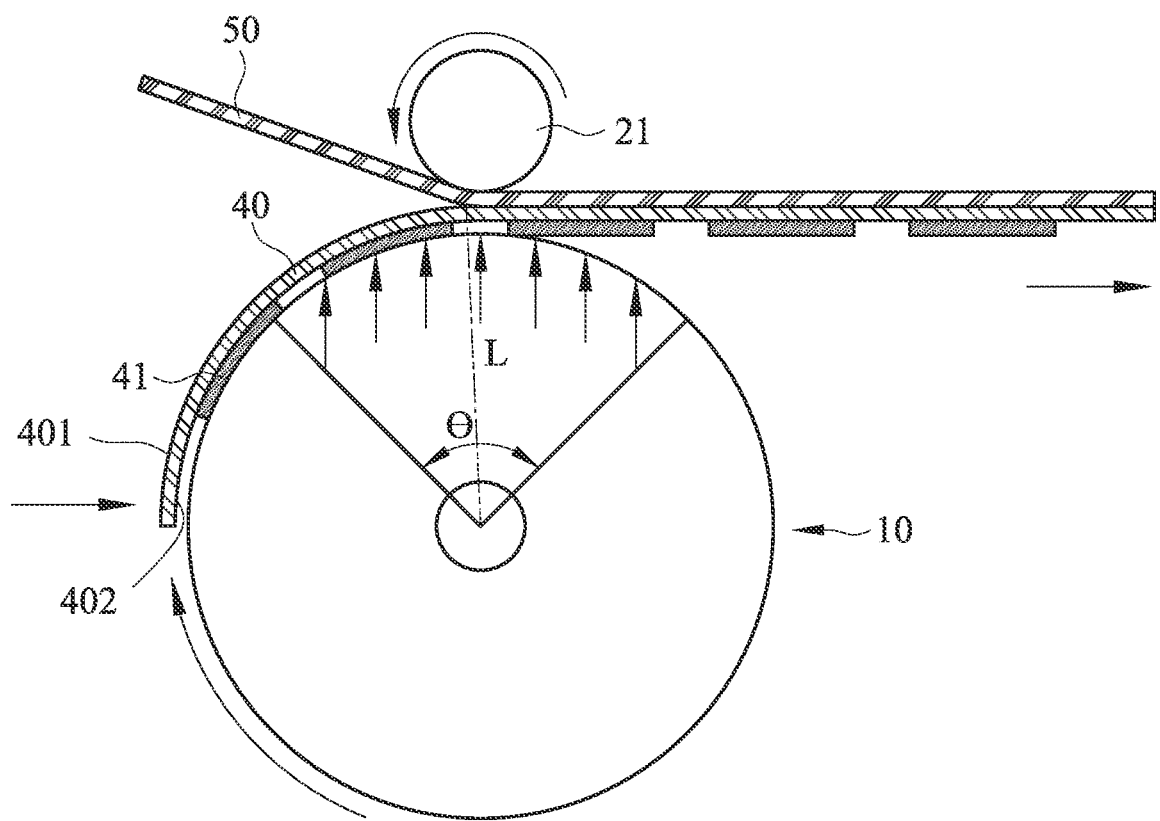

In order to explain the angle of the airflow guide and the arrangement of the through holes 121, please refer to FIGS. 2A and 2B. The air-floating roller 10 can operate in coordination with the bonding roller 21 to press the base film 40 and the bonding film 50 to be bonded. The base film 40 has a first surface 401 and an opposite second surface 402. The bonding film 50 is bonded to the first surface 401 of the base film 40, and the second surface 402 of the base film 40 has a plurality of thin-film components 41. Therefore, the thin-film components 41 of the base film 40 will form a three-dimensional obstacle due to with a certain thickness, and a gap space would be formed between the three-dimensional obstacles. Hence, when bonding, the gap space of the second surface 402 of the base film 40 will affect the bonding flatness between the base film 40 and the bonding film 50.

Due to the thickness of the thin-film components 41 being quite small and the thin-film components 41 being fragile, it is difficult to press the second surface 402 of the base film 40 directly. Therefore, in this invention, by the design of the outer roller 11 and an inner cylinder 12, the air-floating roller (i.e., the air-supplying roller) 10 can continuously supply an airflow, which the pressure of the airflow is 0.1-0.3 kg/cm2, during bonding to the second surface 402 of the base film 40 to fill the gap space. Therefore, the stiffness of the base film 40 is increased to make the base film 40 bond to the bonding film 50 in a flat state. The predetermined angle θ of the airflow is about 20-90 degrees, which may be defined essentially from the central axis of the air-floating roller 10 to the contact point of the base film 40 and the bonding film 50 as the central line L. The predetermined angle θ is calculated on both sides along this central line L. Theoretically, the angles on both sides can be the same. For example, when the predetermined angle θ is 90 degrees, a range of 45 degrees on both sides of the center line L can be configured. However, according to different bonding conditions, the configuration of the predetermined angle θ may also be unequal on both sides. For example, considering that the gap space is difficult to fill (such as a larger range or a more complex shape, etc.), the blowing angle before bonding can be designed (left side of the figure) to be larger, or when the base film 40 and the bonding film 50 are difficult to adhere (such as material problems), the blowing angle after bonding (right side of the figure) can be designed to be larger.

Then please refer to FIGS. 1A-2B, in order to achieve the aforementioned blowing effect, the blowing holes 111 are distributed all the outer surface of the outer roller 11 of the air-floating roller 10. Therefore, the airflow can be guided out regardless of the rotation of the outer roller 11 during the bonding process. As mentioned above, the size of the blowing holes 111 should not be too large to ensure the bonding flatness of the outer roller 11 and the base film 40. For the inner cylinder 12, the through holes 121 are distributed at a predetermined angle θ. Also, the size of the through holes 121 should not be too large to ensure the uniformity of the airflow. General speaking, the size of the through holes 121 are larger than the size of the blowing holes 111.

Figure 3:
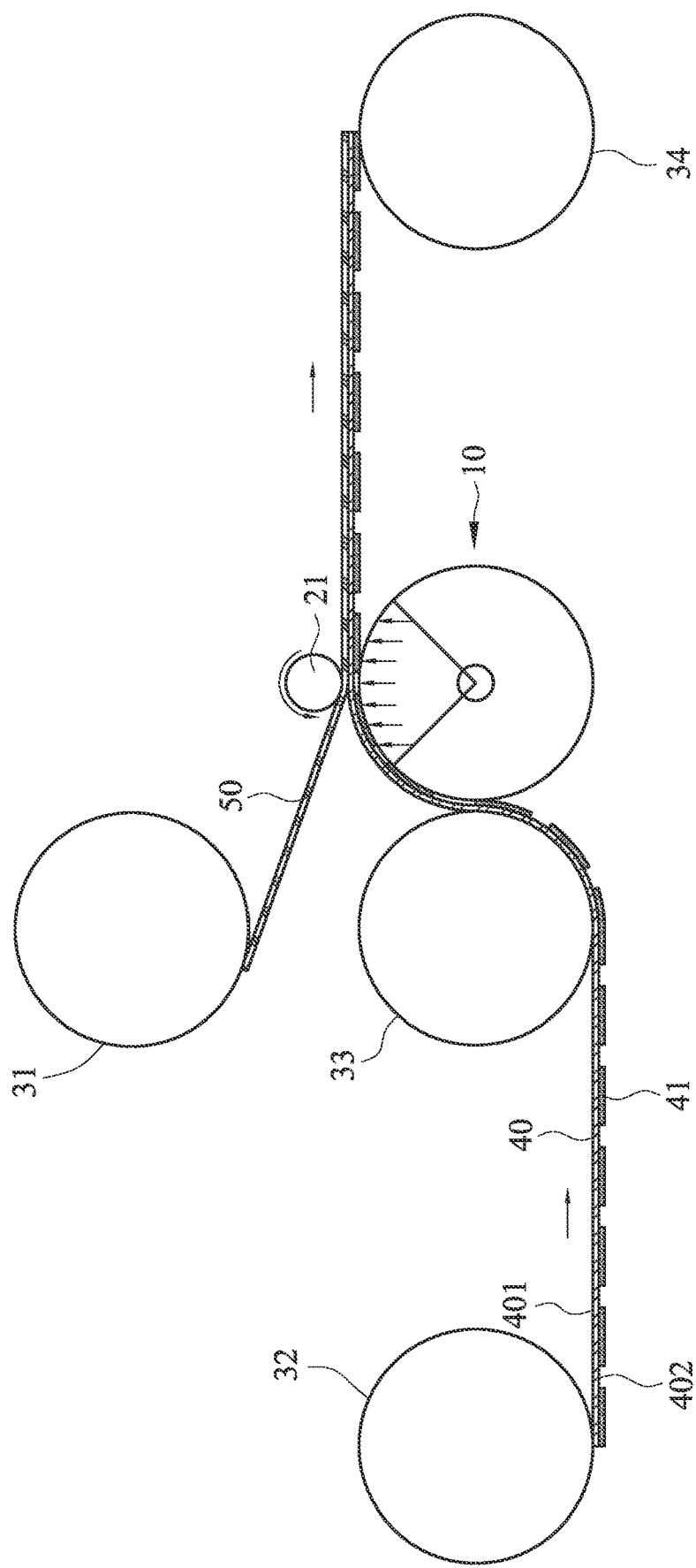
FIG. 3 is a schematic diagram of the air-floating thin film bonding apparatus of this invention.

Please refer to FIG. 3, which is a schematic diagram of the air-floating thin film bonding apparatus of this invention. The air-floating thin film bonding apparatus includes at least two feed rollers, a bonding roller 21 and an air-floating roller 10. The amount of the feed rollers can be modified according to the amount of the laminated films. As shown in the figure, it includes a first feed roller 31 and a second feed roller 32. The first feed roller 31 is used to guide the bonding film 50, and the second feed roller 32 is used to guide the base film 40. Of course, if more films are to be laminated, the corresponding number of the feed rollers will be provided. The description here is only for illustration with drawings, and is not intended to limit the amount and the location.

The following is an example of actual practices. The bonding film 50 is PET (polyethylene terephthalate) or other plastic film, and the base film 40 is a metal film, such as copper, aluminum, etc. The thickness of the metal film is about 0.006-0.02 millimeters (mm). The metal film has a special patterned coating layer (thin-film components 41) thereon, and with a thickness of 0.1-0.3 mm. The coating layer is made of the inorganic powders mixed with the polymers which serves as a binder. Therefore, the coating layer is fragile. The bonding film 50 and the base film 40 are respectively guided by the feed roller 31 and the second feed roller 32. Then, the bonding film 50 and the base film 40 are received by the bonding roller 21 and the air-floating roller 10. The air-floating roller 10 is disposed adjacent and corresponding to the bonding roller 21 to press the bonding film 50 to bond to the base film 40. Also, the free roller 33 can be used to adjust the feeding angle of the base film 40.

Figure 4:
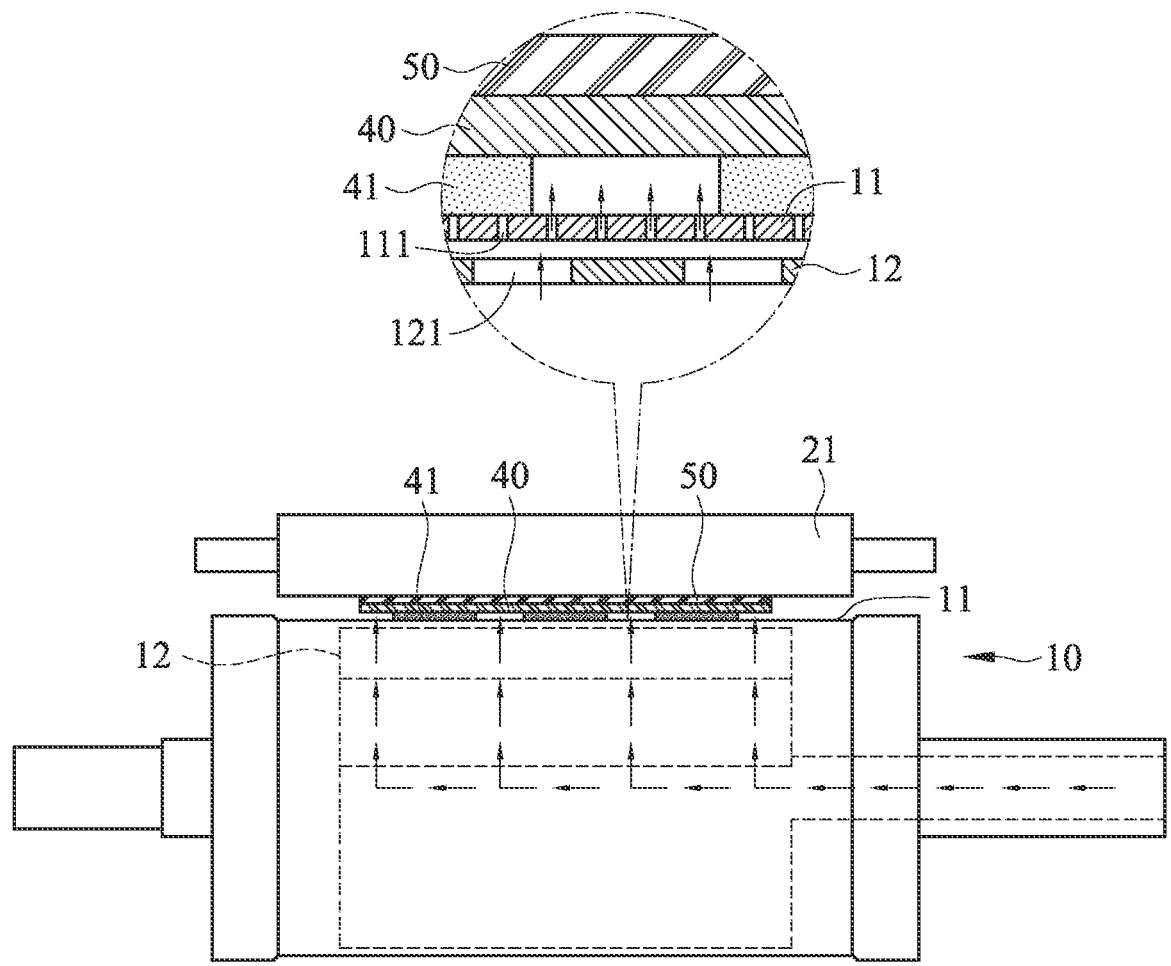
FIG. 4 is a cross-sectional diagram of the air-floating thin film bonding apparatus for illustrating the bonding process of this invention.

The surface hardness of the bonding roller 21 is 40-90 in Shore durometer to avoid the films from being difficult to adhere or cracking due to too high or too low hardness. Also, the thickness of the coating layer is quite small and the coating layer is fragile. It is difficult to press the second surface 402 of the base film 40 directly during the bonding process. Therefore, the airflow with the positive pressure during the bonding process is utilized to fill the gap space of the second surface 402. Please refer to FIG. 4, the inner cylinder 12 of the air-floating roller 10 receives the airflow from the air source connected to the inner cylinder, and guides the airflow through the through holes 121 of the inner cylinder 12 and the blowing holes 111 of the outer roller 11 to fill the gap space between the thin-film components 41 of the base film 40. Therefore, the stiffness of the base film 40 is increased to make the base film 40 bond to the bonding film 50 tightly without wrinkles and defects. After the lamination is completed, the laminated films are wound and stored by the receiving roller 34. Of course, other apparatus or devices may also be used for continuous processing directly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. An air-floating thin film bonding apparatus, comprising:
   at least two feed rollers, used to guide a base film and a bonding film to be bonded together, wherein
      the base film includes a first surface and an opposite second surface, and
      at least two thin-film components with a gap space therebetween are disposed on the second surface;
   a bonding roller, receiving the bonding film guided by one of the feed rollers; and
   an air-supplying roller, receiving the base film guided by another of the feed rollers, wherein the air-supplying roller is disposed adjacent and corresponding to the bonding roller to press the bonding film to bond to the first surface of the base film, and includes:
      an outer roller, including a plurality of blowing holes on its outer surface and being rotatable;
      an inner cylinder, disposed in the outer roller and including a plurality of through holes within a predetermined angle range on its outer surface; and
      an air source, connected to the inner cylinder to provide an airflow to the inner cylinder, wherein the airflow is guided to the blowing holes of the outer roller via the through holes of the inner cylinder to fill the gap space of the second surface of the base film within the predetermined angle range;
      wherein the predetermined angle range is 20-90 degrees.

2. The air-floating thin film bonding apparatus of claim 1, wherein the base film is a metal thin film.

3. The air-floating thin film bonding apparatus of claim 2, wherein a thickness of the metal thin film is 0.006-0.02 millimeters.

4. The air-floating thin film bonding apparatus of claim 1, wherein a pressure of the airflow of the air source is 0.1-0.3 $kg/cm^2$.

5. The air-floating thin film bonding apparatus of claim 1, wherein a thickness of the thin-film components of the base film is 0.1-0.3 millimeters.

6. The air-floating thin film bonding apparatus of claim 1, wherein a surface hardness of the bonding roller is 40-90 in Shore durometer.

7. The air-floating thin film bonding apparatus of claim 1, wherein a size of the through holes is greater than a size of the blowing holes.

8. An air-supplying roller, adapted for corresponding to a bonding roller to bond a base film to a bonding film, wherein the base film includes a first surface and an opposite second surface, and at least two thin-film components with a gap space therebetween are disposed on the second surface, the air-supplying roller comprising:
   an outer roller, including a plurality of blowing holes on its outer surface and being rotatable;
   an inner cylinder, disposed in the outer roller and including a plurality of through holes within a predetermined angle range on its outer surface; and
   an air source, connected to the inner cylinder to provide an airflow to the inner cylinder, wherein the airflow is guided to the blowing holes of the outer roller via the through holes of the inner cylinder to fill the gap space of the second surface of the base film within the predetermined angle range;
   wherein the predetermined angle range is 20-90 degrees.

9. The air-supplying roller of claim 8, wherein a pressure of the airflow of the air source is 0.1-0.3 $kg/cm^2$.

10. The air-supplying roller of claim 8, wherein a size of the through holes is greater than a size of the blowing holes.

* * * * *